United States Patent
Tao et al.

(10) Patent No.: US 7,163,487 B2
(45) Date of Patent: Jan. 16, 2007

(54) ENGINE RETARD OPERATION SCHEDULING AND MANAGEMENT IN A HYBRID VEHICLE

(75) Inventors: Xuefeng T. Tao, Northville, MI (US);
Gregory A. Hubbard, Brighton, MI (US); Tung-Ming Hsieh, Carmel, IN (US); Anthony H. Heap, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 229 days.

(21) Appl. No.: 10/846,001

(22) Filed: May 14, 2004

(65) Prior Publication Data

US 2005/0255966 A1   Nov. 17, 2005

(51) Int. Cl.
*B60W 10/06* (2006.01)

(52) U.S. Cl. .................. 477/3; 903/907; 903/941
(58) Field of Classification Search .............. 477/4, 477/5, 15, 27, 3; 903/903–908, 941, 947
See application file for complete search history.

(56) References Cited

U.S. PATENT DOCUMENTS

| | | | | |
|---|---|---|---|---|
| 5,890,982 | A * | 4/1999 | Meyerle | 475/72 |
| 6,161,641 | A * | 12/2000 | Fukumura et al. | 180/197 |
| 6,813,553 | B1 * | 11/2004 | Nakamura et al. | 701/70 |
| 6,939,263 | B1 * | 9/2005 | Wakashiro et al. | 477/3 |
| 7,001,306 | B1 * | 2/2006 | Suzuki | 477/4 |
| 2001/0020554 | A1 | 9/2001 | Yanese et al. | |
| 2003/0042054 | A1 | 3/2003 | Matsubara et al. | |
| 2003/0098185 | A1 * | 5/2003 | Komeda et al. | 180/65.2 |
| 2003/0102175 | A1 | 6/2003 | Wakashiro et al. | |
| 2005/0090365 | A1 | 4/2005 | Tanai et al. | |
| 2005/0151420 | A1 * | 7/2005 | Crombez et al. | 303/152 |

* cited by examiner

*Primary Examiner*—Sherry Estremsky
(74) *Attorney, Agent, or Firm*—Dan L. Thompson

(57) ABSTRACT

A hybrid vehicle includes a powertrain having a retarded diesel engine, an electric machine and energy storage system. The engine and motor are operatively coupled through one or more planetary gearsets and selective coupling paths in accordance with application and release of various torque transfer devices to a drivetrain via an output. Regenerative and retarded engine braking are coordinated to provide priority to energy return to an energy storage system in accordance with predetermined power flow limits.

8 Claims, 7 Drawing Sheets

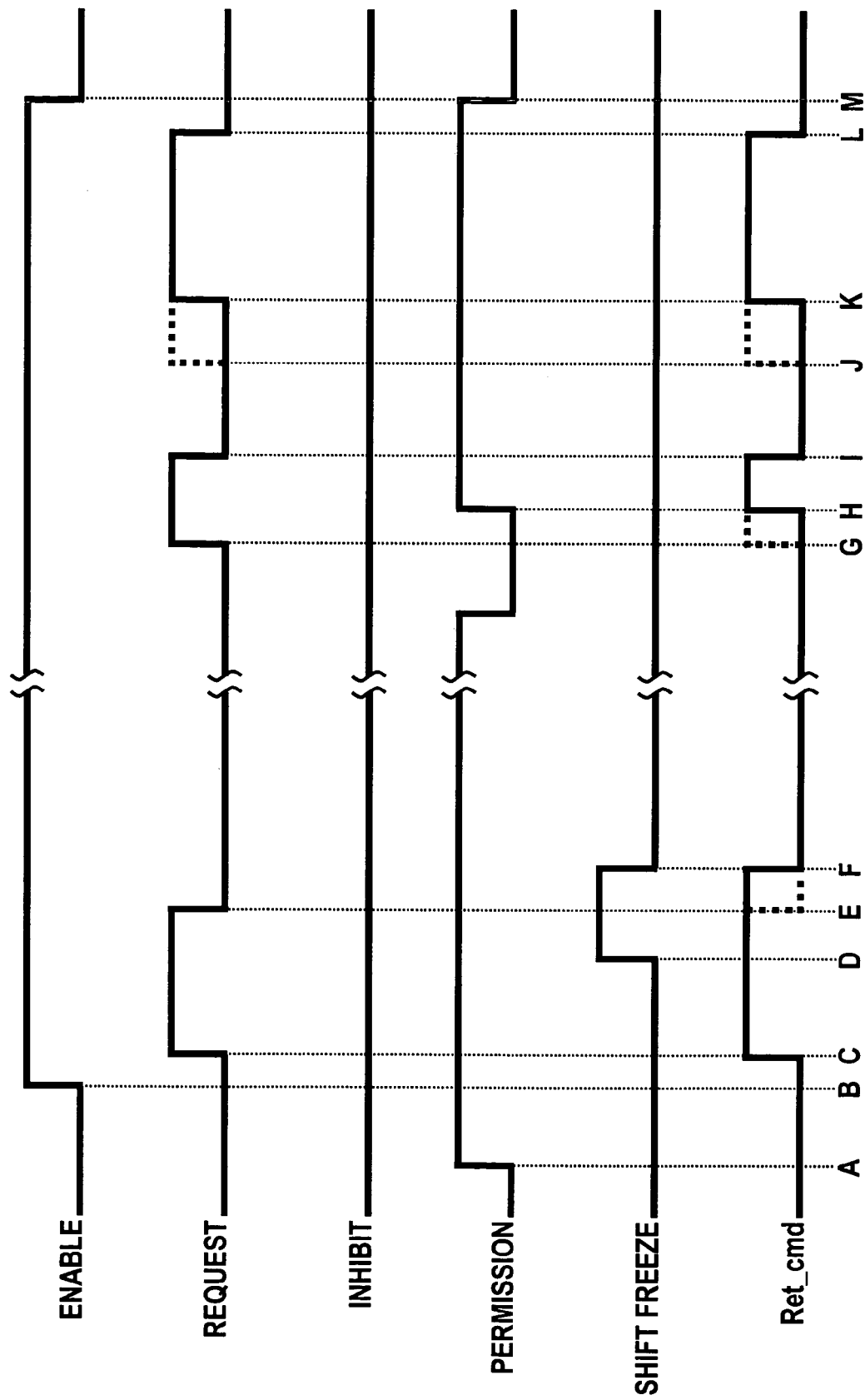

ENGINE RETARD OPERATION SCHEDULING AND MANAGEMENT IN A HYBRID VEHICLE

CROSS-REFERENCE TO RELATED APPLICATIONS

This application is related to co-pending and commonly assigned U.S. Ser. No. 10/845,994 entitled "COORDINATED REGENERATIVE AND ENGINE RETARD BRAKING FOR A HYBRID VEHICLE" filed on even date herewith and incorporated herein by reference.

TECHNICAL FIELD

The present invention is related to hybrid vehicular powertrains. More particularly, the present invention is concerned with vehicle braking management in such powertrains.

BACKGROUND OF THE INVENTION

Various hybrid powertrain architectures are known for managing the input and output torques of various prime-movers in hybrid vehicles, most commonly internal combustion engines and electric machines. Series hybrid architectures are generally characterized by an internal combustion engine driving an electric generator which in turn provides electrical power to an electric drivetrain and to a battery pack. The internal combustion engine in a series hybrid is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack. Parallel hybrid architectures are generally characterized by an internal combustion engine and an electric motor which both have a direct mechanical coupling to the drivetrain. The drivetrain conventionally includes a shifting transmission to provide the necessary gear ratios for wide range operation.

Electrically variable transmissions (EVT) are known which provide for continuously variable speed ratios by combining features from both series and parallel hybrid powertrain architectures. EVTs are operable with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions thereby enabling high-torque continuously variable speed ratios, electrically dominated launches, regenerative braking, engine off idling, and multi-mode operation.

Hybrid powertrains generally rely upon a mechanically operatively decoupled accelerator pedal in determining the propulsion torque request from the vehicle operator, which propulsion torque may be delivered in various contributory splits from the internal combustion engine and the electric machine(s). Similarly, hybrid powertrains may provide all or a portion of braking torque by controlling regenerative operation of the transmission electric machine(s) or by controlling the electric machines in a fashion to transfer vehicle kinetic energy to the engine and dissipate that energy via engine or exhaust braking (engine retard braking) in response to operator braking requests. Hybrid powertrains, therefore, are generally responsive to both accelerator pedal and service brake pedal requests to provide output torque in accordance therewith.

Generally, it is desirable to recover as much kinetic energy from a vehicle braking event as practical by converting to electrical energy to be returned to the electrical energy storage system of the hybrid vehicle. However, even under ideal conditions, the substantial power flows represented by decelerating a massive vehicle may not be able to be accommodated by the energy storage system. Attempting to return too much energy, or returning energy at power flows in excess of the reasonable capacity of the energy storage system to accept same, may result in irreparable harm to the energy storage system. Known regenerative braking systems therefore are generally calibrated rather conservatively to avoid damage to the energy storage system. Furthermore, for other reasons, it may be desirable to limit the power flow into the energy storage system even if its capacity to accept more energy and higher power flow is not limited by such damage considerations. Therefore, even with conservative calibrations, a regenerative braking system may not provide optimum energy return and power flow to the energy storage system in accordance with other desirable objectives.

Engine retard braking has been practiced to dissipate vehicle deceleration energy in conventional powertrain equipped vehicles. Such braking is most desirable with heavy vehicles, particularly when grade descending, to significantly enhance and minimize the need for service brake application. However, engine retard braking has conventionally been employed in a substantially uncontrolled fashion at the request of the vehicle driver in accordance with actuation of the engine braking or exhaust braking mechanism and gear ratio selection. In a hybrid powertrain equipped vehicle, such non-ideal application of engine retard braking may supplant the need for regenerative braking and forgo the significant efficiency gains that might otherwise be effected by returning the dissipated engine retarding energy to the energy storage system. Furthermore, such non-ideal and unpredictable application of engine retard braking frustrates the objective of returning regenerative braking energy in a controlled fashion to the energy storage system.

Therefore, it is desirable to coordinate control of both regenerative braking and engine retard braking in a hybrid vehicle.

SUMMARY OF THE INVENTION

The present invention is a method for controlling retarded engine operation to effect a desired powertrain brake torque in a hybrid powertrain. The powertrain includes an engine having an engine retard mechanism, e.g., exhaust brake or compression brake, and an electrically variable transmission. The transmission includes at least one motor operative in a regenerative mode to provide a regenerative brake torque contribution to the output torque. An electrical energy storage system is provided for providing and accepting charge from the motor. A desired engine brake torque contribution is provided and evaluated in light of the amount of simple motoring torque, i.e., friction and accessory torque, available. The amount of braking torque that the engine is capable of providing is evaluated in light of non-engine related constraints, e.g., motor limitations to determine if feasible engine braking is significantly constrained thereby. Retarded engine operation is enabled when the desired engine brake torque contribution exceeds by a predetermined amount the brake torque available from simple motoring of the engine and non-engine related powertrain constraints do not limit engine brake torque beyond a predetermined amount. Retarded engine operation may be requested based on energy storage system power flow and charge power limits. Retarded engine operation is requested when power flow into the energy storage system exceeds a predetermined limit. When the capacity of the energy storage system to accept power flows in excess of the power being dissipated by retarded engine operation is available, retarded engine operation is scheduled off and regenerative braking contribution increased in accordance therewith. Priority to regenerative braking is accomplished thereby.

BRIEF DESCRIPTION OF THE DRAWINGS

The present invention will now be described, by way of example, with reference to the accompanying drawings, in which:

FIG. 9 is a signal timing diagram which exemplifies the engine retarder scheduling control of the present invention in relation to the logic control schematic of FIG. 8.

DESCRIPTION OF THE PREFERRED EMBODIMENT

Figure 1:
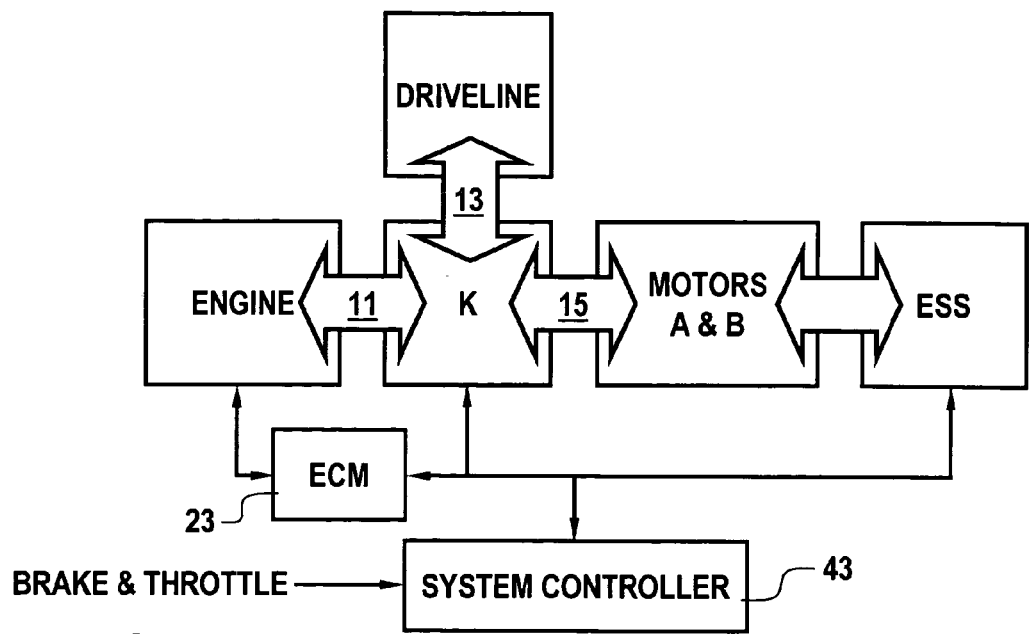
FIG. 1 is a block diagram of hybrid vehicle powertrain in accordance with the present invention.

With reference first to FIG. 1, a block diagram of an exemplary hybrid powertrain to which the present coordinated control of electrically regenerative and engine retard braking is applicable is illustrated. A hybrid powertrain includes a diesel compression ignition engine, a vehicle driveline and one or more electric motors (hereafter motor) operatively coupled to one another, for example, through a coupling means (K) comprising one or more planetary gearsets and selective coupling paths in accordance with application and release of various torque transfer devices. The engine is coupled to the coupling means at a mechanical input thereof (11). The driveline is coupled to the coupling means at a mechanical output thereof (13). The motor is coupled to the coupling means at an input thereof (15). Neglecting power losses, the power flows between the engine, driveline and motor balance. And, the power at the driveline is equivalent to the summation of the powers at the engine and motor. Engine, driveline and motor torques follow the same relationships and are known through the various gearsets, power transmission components and the relationships therebetween as embodied in coupling constraint relationships. Speed relationships between the engine, driveline and motor are also known through the various gearsets, power transmission components and the relationships therebetween as embodied in coupling constraint relationships. The vehicle driveline may include such common driveline components as differential gearsets, propshafts, universal joints, final drive gearsets, wheels and tires. The electric motor receives electric power from and provides electric power to an energy storage system (ESS) which may take the form of one or more batteries in a battery pack module or any appropriate energy storage means capable of bidirectional electrical energy flow. Engine, driveline and motor torques may be in either direction. That is to say, each is capable of bidirectional torque contributions to the powertrain. An exemplary hybrid powertrain comprising a diesel engine, a pair of electric motors and a pair of selectively coupled planetary gearsets and preferred for application of the present control is disclosed in commonly assigned U.S. Pat. No. 5,931,757, the contents of which are incorporated herein by reference.

The exemplary powertrain of FIG. 1 also includes a microprocessor based system controller 43 that communicates with the engine via a conventional microprocessor based engine controller (ECM) 23. The engine controller preferably communicates with the system controller 43 over a controller area network (CAN) bus. The CAN bus allows for communication of control parameters and commands between various modules. The specific communication protocol utilized will be application specific. For example the preferred protocol for heavy duty applications is the Society of Automotive Engineers standard J1939. The engine controller, in turn, is adapted to communicate with various engine actuators and sensors (not separately illustrated) used in the control thereof. For example, fuel injectors, exhaust brake or engine compression brake actuators and rotation sensors are controlled or monitored by discrete signal lines at the engine controller. The system controller 43 communicates with various coupling means actuators and sensors used in the control thereof. For example, output rotation sensors and solenoid control valves for controlling torque transfer device hydraulic pressure and apply/release states and hydraulic fluid pressure transducers are controlled or monitored by discrete signal lines. Additionally, the system controller 43 communicates similarly with a microprocessor based battery pack controller and microprocessor based power electronics controller (not separately illustrated), collectively referred to as ESS controllers. These ESS controllers preferably communicate with the system controller 43 over a CAN bus. The ESS controllers, in turn, are adapted to provide a variety of sensing, diagnostic and control functions related to the battery pack and motor. For example, current and voltage sensors, temperature sensors, multiphase inverter electronics and motor rotation sensors are controlled or monitored by the ESS controllers.

Powertrain control has the general objective of meeting the operator torque request. In a propulsion mode of operation wherein positive output torque is requested, this control is preferably accomplished in accordance with selected engine torque and speed operating points in accordance with predetermined criteria, including system efficiency objectives. Engine torque control is handled by the engine controller in accordance with a commanded engine torque, Te_cmd, determined by the system controller, and engine speed control is handled by a speed control directed through the control of electric motor torque. Preferred methods for determining engine speed and engine torque and controlling engine speed are disclosed in commonly assigned and co-pending U.S. Ser. Nos. 10/686,511, 10/686,508, 10/686,034, and 10/799,531, which are all incorporated herein by reference. Generally, system controller 43 determines a commanded output torque, To_cmd, for use in the control of the powertrain. The determination of To_cmd is made based upon operator input factors such as throttle pedal position and brake pedal effort and vehicle dynamic conditions such as vehicle speed. Other operator input factors such as shift selector position and power take-off requests, vehicle dynamic conditions such as acceleration and deceleration rate, and other operational conditions such as temperatures, voltages, currents and member speeds may also influence the determination of output torque. System controller 43 also determines the constitution of the output torque in terms of engine and electric machine contributions and splits. The powertrain propulsion controls are adapted in the present invention operating in the negative torque domain through provision of engine torque operating points in accordance with know retarded engine torque characteristics across engine speeds and provision of engine speed operating points determined in accordance with the present invention.

The present invention is concerned with operation of the vehicle in a manner in which no propulsion torque is provided to the output and further wherein the driveline torque is driving the motor and/or engine through the coupling means, K. At a minimum, this corresponds generally to a released throttle pedal with or without some degree or level of brake pedal effort. Throttle pedal position and brake effort signals are also monitored by system controller 43. Brake effort may, for example, be provided in pneumatic and hydraulic braking systems from conventional pressure transducers (not shown). Throttle position may, for example, be provided by conventional displacement sensors for transducing throttle pedal travel.

Throttle and brake requests are filtered and conditioned from throttle position and brake system pressure sensors, respectively. Preferably the request signals are scaled and available in a normalized range of 0 to 100 representing the percentage of a full request. For example, a completely depressed throttle pedal would result in a throttle request signal equivalent to 100, whereas an operator stepping completely off of the throttle pedal would result in a throttle request signal equivalent to 0. For purposes of the present coordinated brake control, the brake request is scaled within a relatively early region of application pressures corresponding to a region of braking output torque for which the coordinated control is applicable. No service brake pedal effort results in a brake request signal of 0 with increasing service brake pedal efforts resulting in increasing brake request signals up to a maximum of 100 in accordance with system calibrations. Within this early region of service brake pedal effort, no or minimal service brake application via the vehicular pneumatically or hydraulically applied friction brakes is effected. Increases in brake pedal effort beyond the maximum of 100 in this earliest region brake pedal effort results in increasing application of the pneumatically or hydraulically applied friction brakes.

Figure 2:
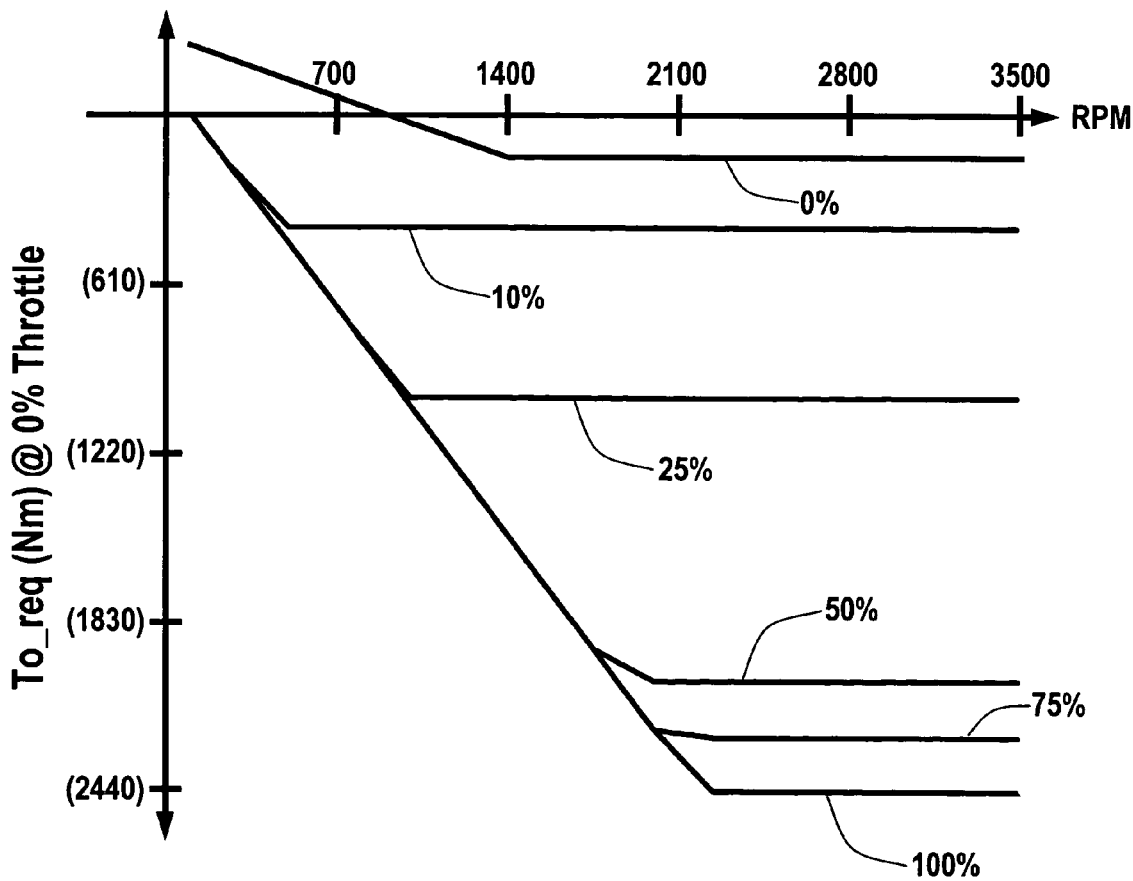
FIG. 2 is a graphical representation of resolved requested output torques at various powertrain output speeds for a variety of brake pedal actuations within a predetermined range thereof in accord with the present invention.

With reference to FIG. 2, various brake pedal lines of constant effort are illustrated and variously labeled as percentages corresponding to the scaling described herein previously. Each line represents—across a range of output speeds, No—a resolved output torque request, To_req, for use in the control of the powertrain. The output torque request, To_req, represents the total desired torque to be established at the output including by regenerative and engine retard braking contributions.

One objective of the present coordinated control is to prioritize the braking energy path as between regeneration and engine retard with the first priority being to return as much of the braking energy to the ESS in accordance with various considerations including physical capacity to accept charge and other factors such as electrical power throughput objectives.

Figure 3:
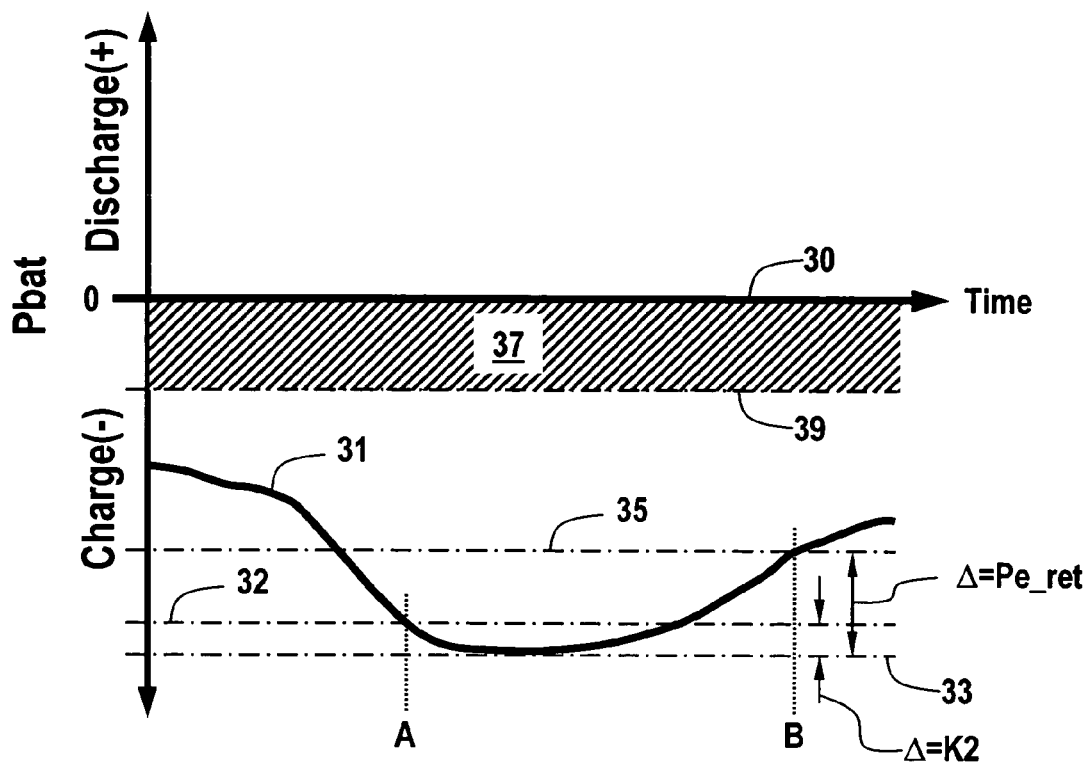
FIG. 3 is a graphical representation of exemplary battery power flows and a variety of various battery power flow thresholds and limits in accordance with the present invention.

With reference to FIG. 3, regions of energy storage system power flows are illustrated. Power flows are labeled as battery power, Pbat, and comprise a discharge region above the horizontal line 30 wherein net power flow is out of the battery pack and a charge region below the horizontal line wherein net power flow is into of the battery pack. By chosen sign convention, charge power flow is shown as negative and discharge power flow is shown as positive. The further away from the horizontal line 30 the battery power is located, the greater the magnitude of power flow. It is the charge region that is of particular interest in the retarded engine braking scheduling control of the present invention.

With the chosen sign convention and with respect to an arbitrary power flow in the charge region, decreasing power flow refers to larger negative values. And, increasing power flow refers to smaller negative values. Similarly, with respect to an arbitrary power flow in the discharge region, decreasing power flow refers to smaller positive values. And, increasing power flow refers to larger positive values. Therefore, larger power flows into the battery pack correspond to large negative values. Similarly, larger power flows out of the battery pack correspond to larger positive values.

Discharge power limits, Pbat_max, and charge power limits, Pbat_min, are predetermined and represent maximum desired power flow out of and into the battery pack, respectively. Values for Pbat_max and Pbat_min follow the sign convention described for discharge and charge power flows. Pbat_min and Pbat_max are continually updated in accordance with a variety of physical and non-physical factors and considerations representing present charge acceptance capabilities and power flow preferences. These power flow limits, Pbat_min and Pbat_max, are preferably obtained from data sets stored in table form within data structures in the system controller 43. Such data sets are provided for reference by various control routines in pre-stored table format having been correlated to various conditions, e.g., state of charge, temperature, voltage and preference considerations, e.g., usage or throughput (amp-hour/hour). A preferred method of determining minimum and maximum battery power is disclosed in commonly assigned and co-pending U.S. Ser. No. 10/686,180 which is incorporated herein by reference. Pbat_max and Pbat_min generally represent acceptable limits on power flow for the battery pack and charges and discharges located within the envelope established thereby are generally acceptable.

During a braking event in accordance with the present invention, it is generally desirable that braking energy is first returned via regeneration to the battery pack and then dissipated via engine retard braking. And, it is understood that engine retarding at higher engine speeds corresponds to higher energy dissipation, higher power and higher torques at the engine. Minimum battery power, Pbat_min, therefore serves a role in the control by establishing a threshold beyond which greater power flows into the battery pack are undesirable. The difference between actual battery power flow and Pbat_min (battery difference) is used to establish a desired retarded engine speed which will establish a braking power flow to substantially converge the battery power flow to Pbat_min, i.e., drive the battery difference to zero. Thus, the optimum energy return to the battery pack can be realized and excessive power flow thereto avoided.

Additionally, the difference between the actual or commanded output torque (output difference) and the requested output torque, established in accord with the brake pedal effort previously described in conjunction with FIG. 2, provides an alternative basis upon which desired retarded engine speed may be determined. Such output difference is used to establish a desired retarded engine speed which will establish a braking power flow to substantially converge the output torque to the requested output torque, i.e., drive the output difference to zero. One of the battery difference or the output difference is selectively used in the determination of desired retarded engine speed in accordance with the significance of the output difference and the battery differences. Insignificant output difference would result in use of the battery difference for engine speed determination, whereas significant output difference would result in an additional comparative selection of the one of the battery and output differences to be used in desired retarded engine speed determination. An exemplary control for establishing a desired retarded engine speed (Ne_des) is disclosed in commonly assigned and co-pending U.S. Ser. No. 10/845,994, previously incorporated herein by reference.

Where Pbat_min threshold is tight, i.e., relatively small negative value, it is determined that the battery pack cannot accept significant power flow thereto and that engine retard braking is generally indicated. A tight Pbat_min threshold may be visually represented as values for Pbat_min which are within cross hatched region labeled 37 of FIG. 3 between line 30 and tight threshold limit line 39. It follows that a Pbat_min threshold that is not tight correspond to values for Pbat_min which are on the opposite side of tight threshold limit line 39.

Figure 4:
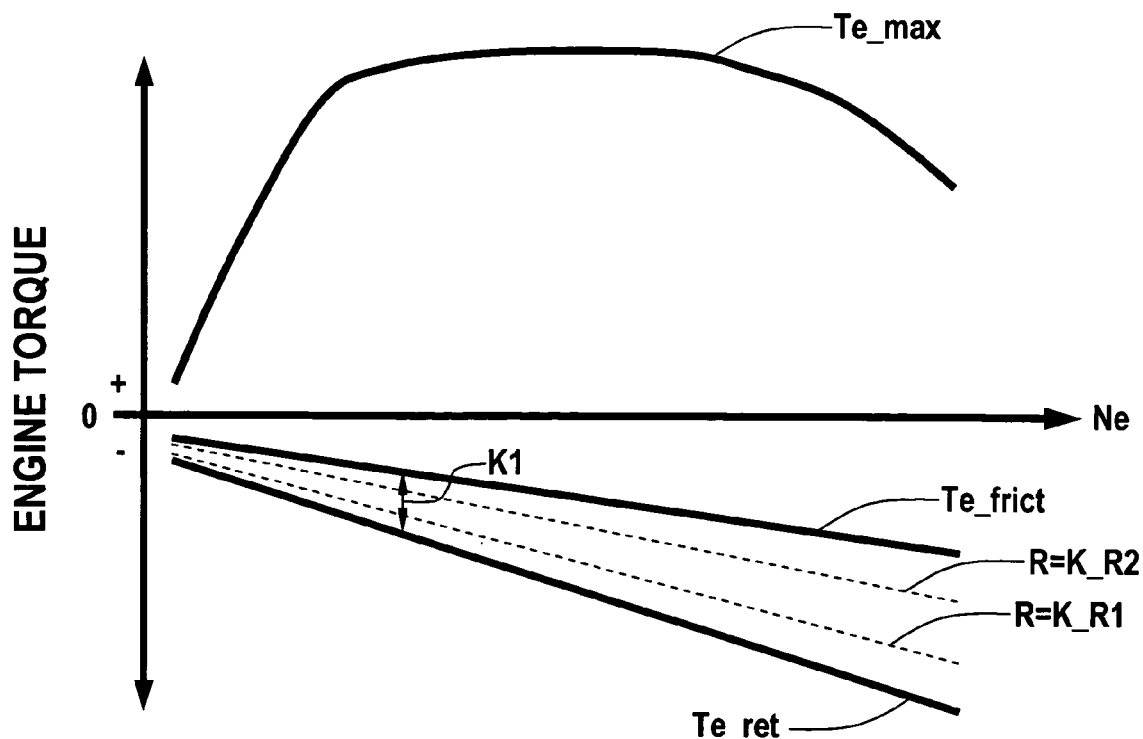
FIG. 4 is a graphical representation of engine torque versus engine speed emphasizing a variety of negative torque domain thresholds and limits in accordance with the present invention.

With reference now to FIG. 4, both positive (propulsion) engine torque limits (Te_max) and negative (braking) retarded engine torque limits (Te_ret) are illustrated across engine operating speeds (Ne). The negative torque limit, Te_ret, shows the general characteristic of motored retarded engine operation, (e.g., engine brake or exhaust brake on, unfueled), wherein Te_ret becomes more negative, i.e., larger braking torque, at higher engine speeds. Also similarly illustrated in FIG. 4 is negative (braking) non-retarded engine torque limits (Te_frict) which represents a motored engine's general braking torque characteristics—predominantly resulting from engine friction and engine parasitic load.

Figure 8:
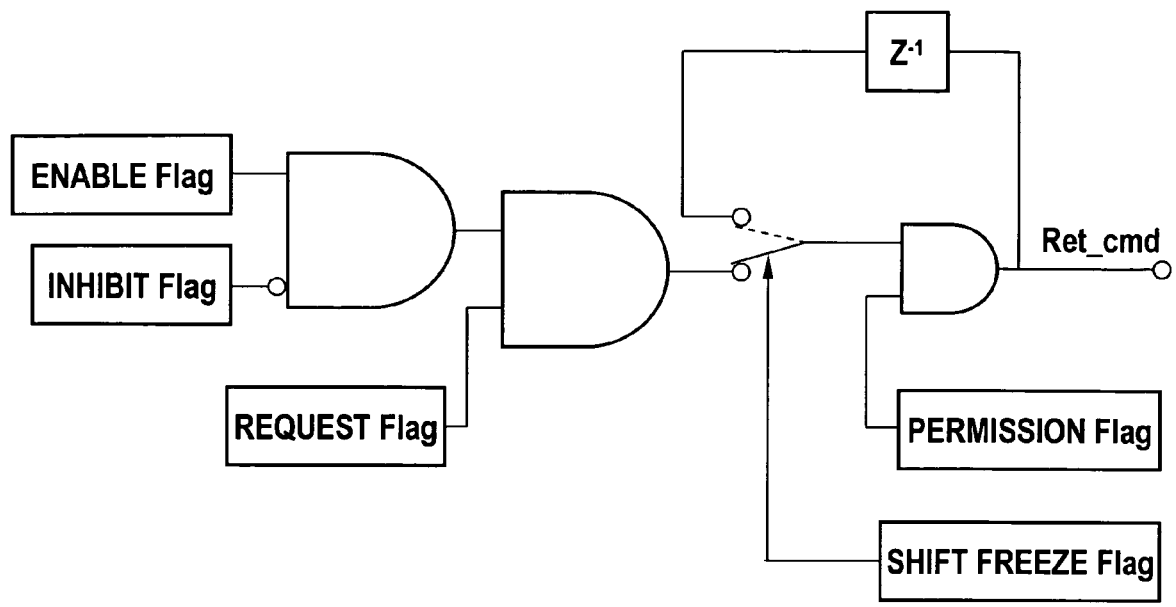
FIG. 8 is a logic control schematic related to scheduling engine retard braking in accord with the present invention.

With reference now to FIG. 8, a preferred logic control schematic related to scheduling engine retard braking in accord with the present invention shows a number of logical evaluations performed upon a plurality of flags in establishing the output state of the engine retarder command flag (Ret_cmd). The engine retarder command flag Ret_cmd is provided to the engine controller for use in establishing the state of the engine brake or exhaust brake. Generally, the ENABLE flag provides a torque based indication of whether retarded engine operation is desirable. An input torque operating point (Ti) determined in accordance with the powertrain control in the negative torque domain is evaluated to determine whether the braking torque requirements indicated thereby are sufficiently in excess of the amount of braking torque that can be provided by simple motoring of the engine to indicate the desirability of providing an engine retarder braking torque contribution. Simple motoring of the engine includes unfueled external rotation of the engine without added compression braking, exhaust braking or substantial equivalent torque, but may include accessory drive torque. In a hybrid powertrain wherein braking priority is first to regenerative braking, the input torque operating point determined is in accordance with such consideration and represents an input torque required to balance the output and motor torques of the powertrain. A preferred method of determining an input torque operating point is described in detail in U.S. Ser. No. 10/799,531.

Generally, the INHIBIT flag provides a constraint based indication of whether retarded engine operation is within the present capabilities of the powertrain. A minimum input torque (Ti_min) in the negative torque domain determined in accordance with predetermined powertrain constraints corresponding to a variety of current operating conditions is evaluated to determine whether retarding the engine at the present engine speed can be effected by the powertrain within the limit established by minimum input torque (Ti_min). In a hybrid powertrain, considering the necessity of torque balancing between and among the input, output and motors, negative input torques, i.e., engine braking torques, may be constrained or limited as a function of constraints or limitations elsewhere in the powertrain system. Ti_min is dominated by motor and electrical constraints and may be affected by such exemplary conditions as motor and battery temperature, battery voltage, and predetermined power throughput limits. It is in view of such non-engine related constraints that Ti_min is determined.

Generally, the REQUEST flag provides a battery power flow based indication of whether retarded engine operation is desirable. Such indicator tends to be more temporal or dynamic in nature than the torque based and constraint capability based considerations described with respect to the establishment of the ENABLE and INHIBIT flags. In a hybrid powertrain, and consistent with the general expressed objective of regenerative braking priority, the continuing capability of the battery to accept regenerative power is monitored with insignificant headroom generally indicating the desirability of engine retarder torque braking assistance and significant headroom generally indicating the undesirability of engine retarder torque braking assistance. The predetermined desired retarded engine speed may additionally be evaluated as an indicator of the desirability of requesting engine retarder activation or deactivation with desired speeds significantly in excess of low grade coastdown values weighing in favor of engine retarder torque contributions and desired speeds close to idle values weighing in disfavor of engine retarder torque contributions.

A PERMISSION flag is illustrated providing a highest priority gating or masking of the logically processed ENABLE, INHIBIT and REQUEST flags. A number of factors, including direct operator settings and generally high priority control commands, e.g., related to vehicle stability and handling enhancement systems such as anti-lock braking, are evaluated in determination of whether a request for engine retarder braking contribution is masked.

Finally with respect to the logic control schematic related to scheduling engine retard braking of FIG. 8, a SHIFT FREEZE flag is shown effective to maintain the active state of Ret_cmd when a shift is in progress to avoid undesirable input torque disturbances during a range or mode shift which can adversely affect shift quality. Such a SHIFT FREEZE flag may be set at an appropriate time during a shift process, for example at the inception of a clutch fill, an reset at an equally appropriate time corresponding to shift completion.

FIG. 9. illustrates a signal timing diagram which exemplifies the engine retarder scheduling control of the present invention in relation to the logic control schematic of FIG. 8 and corresponding flags previously described. ENABLE flag is illustrated as being set at a time B and remaining set through a duration until time M. REQUEST flag is set at time C. At time C, the INHIBIT flag is low, the PERMISSION flag is high and the SHIFT FREEZE flag is low. Hence, Ret_cmd is set at time C. At time E the REQUEST flag is reset, the INHIBIT flag is low and the PERMISSION flag is high. However, the SHIFT FREEZE flag was set at a prior time D and remains high. Hence, whereas normally the REQUEST flag reset would cause Ret_cmd to reset, the SHIFT FREEZE flag condition maintains the set state of Ret_cmd subsequent to the REQUEST flag reset until time F whereat the SHIFT FREEZE flag is reset with the REQUEST flag and INHIBIT flag still low and the PERMISSION flag still high. At a subsequent time G, the REQUEST flag is set and the INHIBIT flag is still low. But the PERMISSION flag had been reset at a time prior. Hence, whereas normally the REQUEST flag set would cause Ret_cmd to set, the PERMISSION flag condition masks the REQUEST flag setting until a subsequent time H whereat the PERMISSION flag is once again set. The REQUEST flag is reset at time I and the INHIBIT and PERMISSION flags are low and high, respectively, thereby resulting in the resetting of the Ret_cmd. At time J, the conditions for setting the REQUEST flag are once again met and the INHIBIT flag is low and the PERMISSION flag is high. Normally, the REQUEST flag would be set at this time and the Ret_cmd also thereby set. But the conditions for the setting of the REQUEST command at time J is too close in time to the prior resetting of the Ret_cmd at time I and the setting of the REQUEST flag is therefore suppressed or masked until passage of a predetermined time to prevent frequent control cycling. In this example, the duration during which the suppression is effective is consistent with the duration from time I to time K. At time K, therefore, since the REQUEST flag is still high and the other relevant flag conditions allow, the Ret_cmd is set high.

Figure 5A:
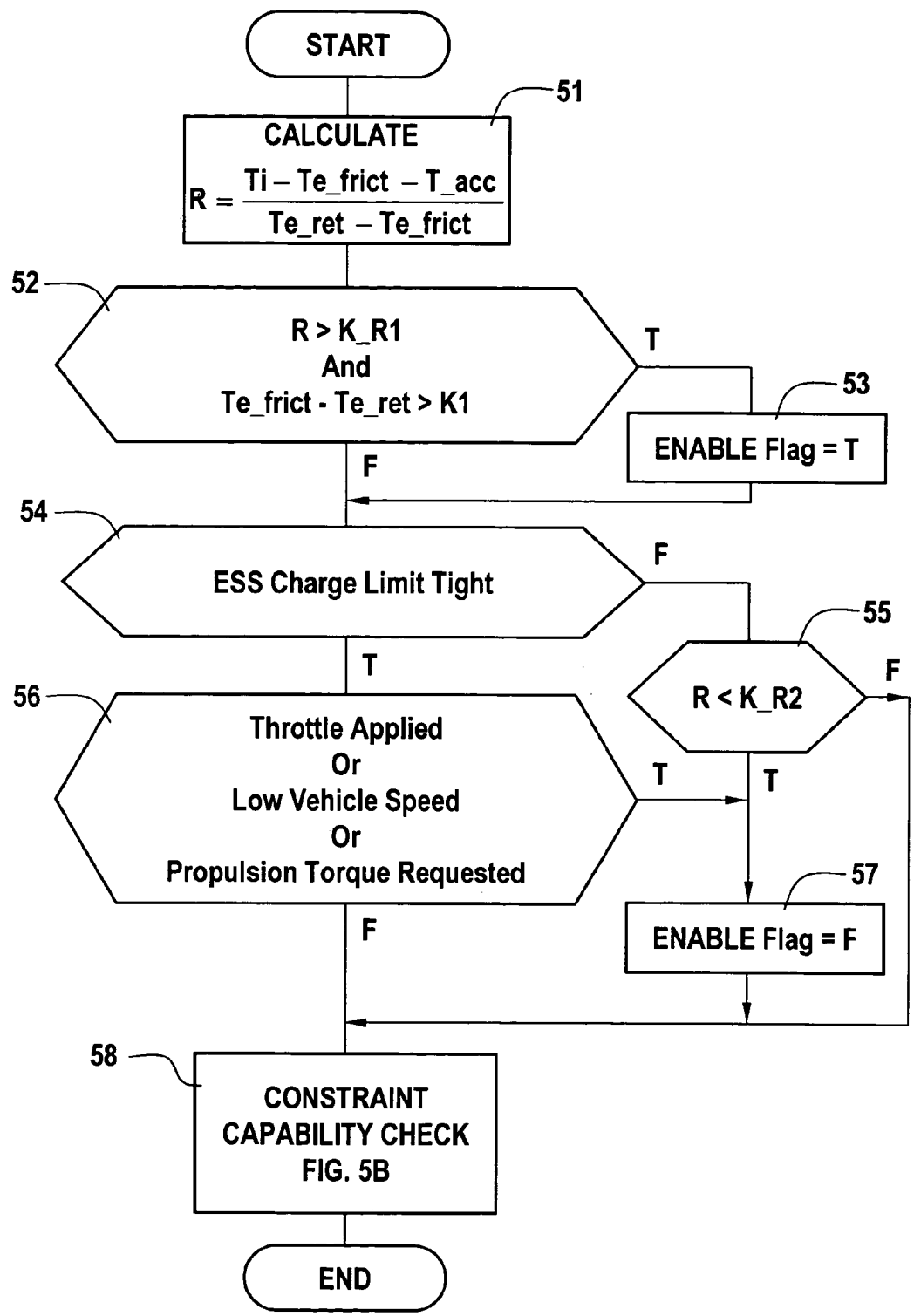
FIGS. 5–7 are flow charts representing a set of exemplary steps related to scheduling engine retard braking in accord with the present invention.
Figure 5B:
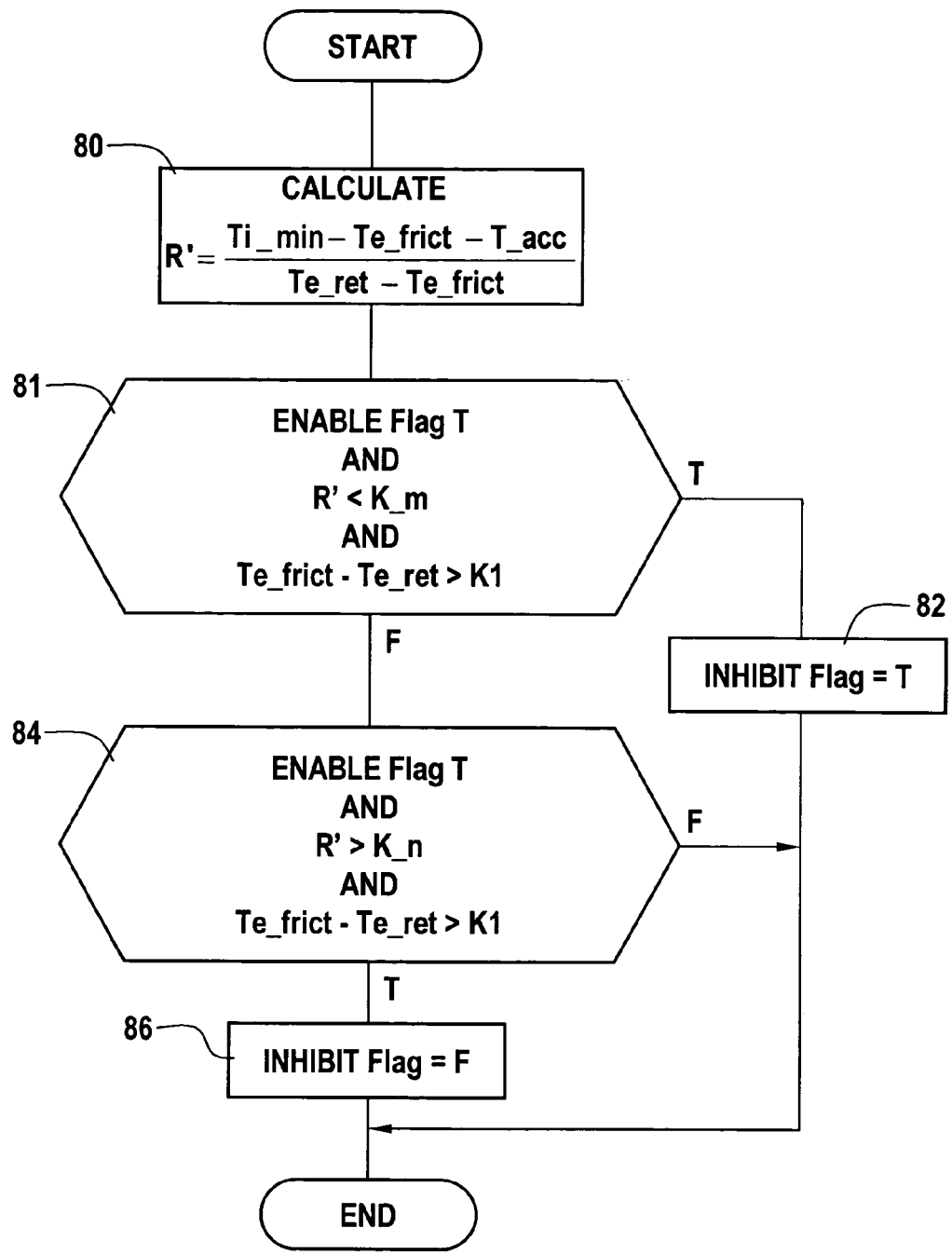
Figure 6:
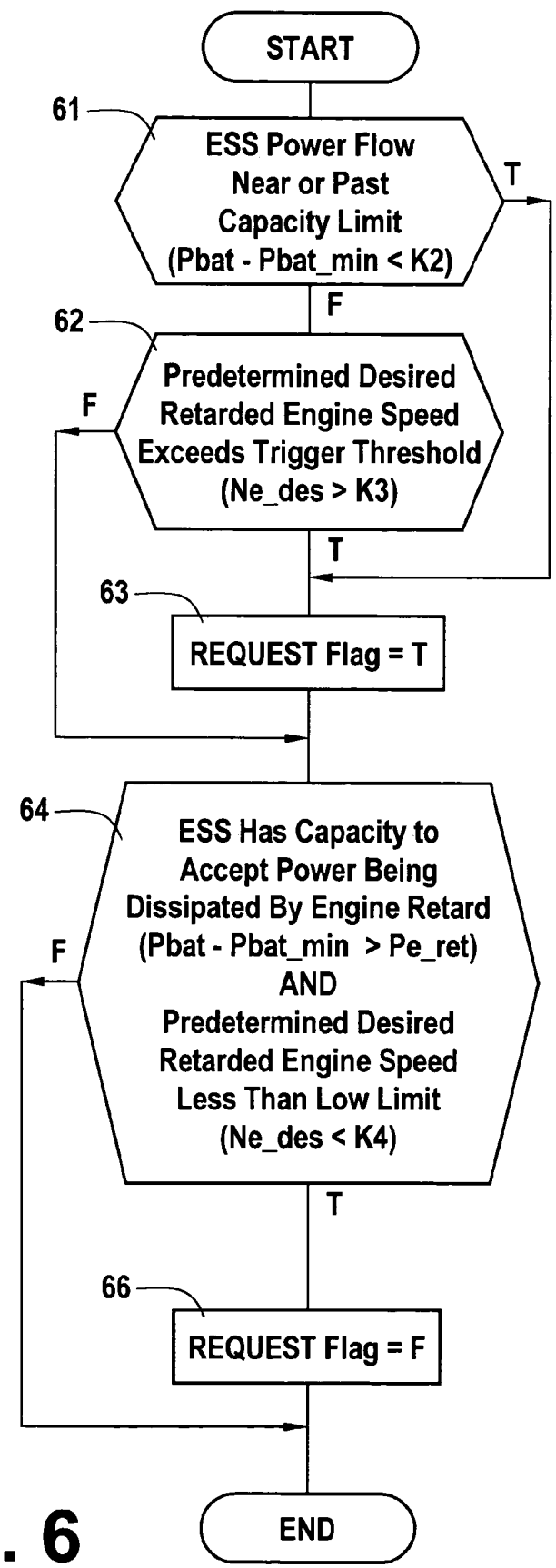
Figure 7:
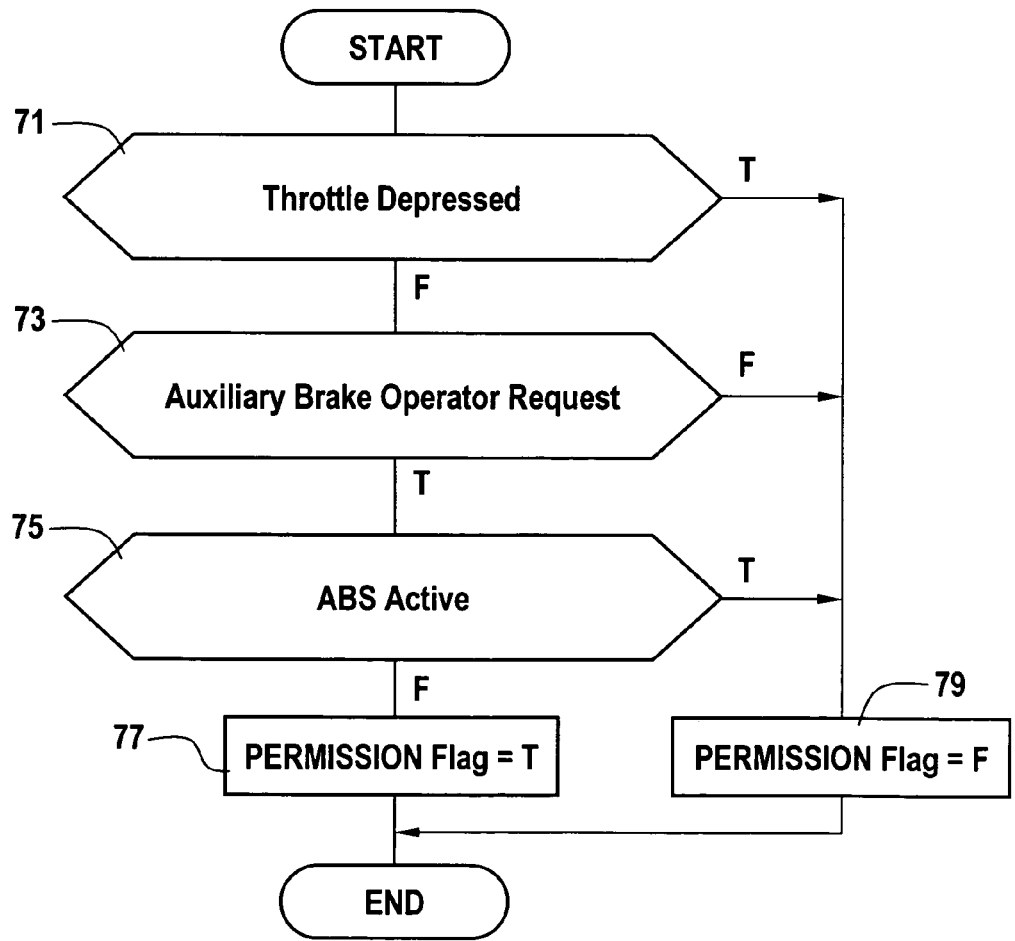

With reference now to FIGS. 5–7, several flow charts are shown which illustrate certain preferred steps executed as part of a computer program by controller 43 in scheduling engine retard braking in accordance with the present invention. FIG. 5 illustrates the preferred steps for the establishment of the ENABLE flag and the INHIBIT flags. FIG. 6 illustrates the establishment of the REQUEST flag. FIG. 7 illustrates the establishment of the PERMISSION flag.

Beginning with the routine of FIG. 5A, the torque based indication of whether retarded engine operation is desirable, ENABLE flag, is determined. In the present exemplary embodiment, this is accomplished by determining the relationship of the input torque operating point Ti, determined in accordance with the powertrain control, with the motored engine torques corresponding to retarded and unretarded operations. With additional reference to FIG. 4, the general objective of step 51 of FIG. 5A is to determine a ratio (R) indicative of the location of the present input torque Ti with respect to the known engine speed Ne dependent motored engine friction torque line Te_frict and motored engine retard torque line Te_ret. Input torque Ti and engine retard torque Te_ret are each normalized relative to the friction torque Te_frict and the input torque is further adjusted for the parasitic accessory load torque (T_acc). The ratio R has a value between 0 and 1 for values of Ti between Te_frict and Te_ret, respectively. The closer the input torque Ti is to the engine retard torque Te_ret, the closer to unity is R and the stronger is the assumption that scheduling of the engine retard activation is desirable. It follows then that The closer the input torque Ti is to the engine friction torque Te_frict, the closer to zero is R and the stronger is the assumption that scheduling of the engine retard deactivation is desirable. Therefore, at step 52 of FIG. 5, the ratio R is compared with a first calibrated threshold (K_R1) which if exceeded is indicative of the desirability of scheduling the engine retarder activation. An exemplary graphical representation of K_R1 is shown in FIG. 4. Another comparison is also preferably performed at step 52 which essentially determines if the torque difference between the engine friction torque and engine retard torque at present engine speed Ne is sufficiently large to ensure stability in the comparisons and determinations being made. If the difference is greater than a calibrated threshold (K1) then there is assumed sufficient torque differential to ensure stability. An exemplary graphical representation of K1 is shown in FIG. 4 wherein differences to the right of K1 exceed the threshold and differences to the left thereof do not exceed the threshold. Affirmative results of both comparisons of step 52 results in ENABLE flag being set or true. A negative result of either such comparison bypasses setting the ENABLE flag.

Step 54 is encountered subsequent to setting or bypassing the setting of the ENABLE flag. Beginning here, exit conditions are evaluated to determine whether to exit an engine retarder activation. Specifically at step 54, it is determined based on the present battery power charge limit, Pbat_min, what evaluations are most appropriate for the exit decision. Where battery power charge limit Pbat_min is tight, i.e., very small magnitude, a set of evaluations is performed at step 56 which generally ensure reliability of any decision to exit the engine retarder activation. When Pbat_min is tight, the inout torque operating point, Ti, which is calculated corresponding to such tight limits, is not considered to be sufficient for use in calculating a reliable ration, R. Therefore, alternative considerations, e.g., driver inputs and vehicle conditions, are used in determining whether to exit an engine retarder activation. At step 56, if throttle application is sensed, low vehicle speed is sensed or positive torque requests issued by the control, engine retarder deactivation is indicated and results in ENABLE flag being reset or false at step 57. A negative result to all comparison at step 56 bypasses resetting the ENABLE flag. Throttle application, low vehicle speed and requested propulsion torque are all determined in accordance with comparisons to appropriate respective thresholds. For example, a throttle depression above about 5% to about 10%, a vehicle speed below about 8 KPH to 10 KPH and propulsion torque request in excess of about 3% (where 100% equals a fixed engine reference torque calibration) each may indicate the desirability of engine retarder deactivation. Where battery power charge limit Pbat_min is not tight, an evaluation is performed at step 55 which compares the ratio R from step 51 with a second calibrated threshold (K_R2) which if between R and Te_ret is indicative of the desirability of scheduling the engine retarder deactivation and results in ENABLE flag being reset or false at step 57. A negative result of such comparison at step 55 bypasses resetting the ENABLE flag. An exemplary graphical representation of K_R2 is shown in FIG. 4.

Step 58 is encountered subsequent to resetting or bypassing the resetting of the ENABLE flag. Reference is now made to FIG. 5B. Here, the constraint based indication of whether retarded engine operation is within the present capabilities—predominantly the motor torques available in view of machine and electrical constraints—of the powertrain is determined. In the present exemplary embodiment, this is accomplished by determining the relationship of the minimum input torque Ti_min, determined in accordance with predetermined powertrain constraints, relative to the retarded engine torque Te_ret at the present engine speed. With additional reference to FIG. 4, the general objective of step 80 of FIG. 5B is to determine a ratio (R') indicative of the location of the present minimum input torque Ti_min with respect to the known engine speed Ne dependent motored engine friction torque line Te_frict and motored engine retard torque line Te_ret. Minimum input torque Ti_min and engine retard torque Te_ret are each normalized relative to the friction torque Te_frict and the input torque is further adjusted for the parasitic accessory load torque (T_acc). The ratio R' has a value between 0 and 1 for values of Ti_min between Te_frict and Te_ret, respectively. The closer the minimum input torque Ti_min is to the engine retard torque Te_ret, the closer to unity is R' and the stronger is the assumption that there is no significant shortfall in the capability of the system to effect Te_ret. It follows then that the closer the minimum input torque Ti_min is to the engine friction torque Te_frict, the closer to zero is R and the stronger is the assumption that there is a shortfall in the capability of the system to effect Te_ret. Therefore, at step 81 of FIG. 5B, the ratio R' is compared with a first calibrated threshold (K_m) which if not exceeded is indicative of the desirability of inhibiting the engine retarder activation based upon the described system capability considerations. In such a case, the INHIBIT flag is set to true at step 82. It false at step 81, the ratio R' is compared at step 84 of FIG. 5B with a second calibrated threshold (K_n) which if exceeded is indicative of the desirability of not inhibiting the engine retarder activation based upon the described system capability considerations. In such a case, the INHIBIT flag is set to false at step 86. Thresholds K_n and K_m would have the same general relationship to Te_ret and Te_frict and to each other as the thresholds K_R1 and K_R2, respectively, as shown in FIG. 4. Steps 81 and 84 also perform a comparison based on the state of the ENABLE Flag, wherein a false ENABLE flag does not require the tests to be performed and no INHIBIT flag state changes are made. Another comparison is also preferably performed at steps 81 and 84 which essentially determines if the torque difference between the engine friction torque and engine retard torque at present engine speed Ne is sufficiently large to ensure stability in the comparisons and determinations being made. If the difference is greater than a calibrated threshold (K1) then there is assumed sufficient torque differential to ensure stability. An exemplary graphical representation of K1 is shown in FIG. 4 wherein differences to the right of K1 exceed the threshold and differences to the left thereof do not exceed the threshold. Therefore, where a capability based torque shortfall is determined, the INHIBIT flag is set true and where a capability based torque shortfall is not determined, the INHIBIT flag is reset false.

Determination of the battery power flow based indication of whether retarded engine operation is desirable is accomplished by the steps of FIG. 6 which result in setting or resetting of the REQUEST flag as required. At step 61, battery charge power flow limit Pbat_min is compared with the actual battery power flow Pbat. Where actual battery power flow is relatively close to the limit or has crossed the limit, the REQUEST flag is set at step 63. The determination is effected by taking the difference between the actual and limit values for Pbat and comparing it to a calibration threshold (K2). This is graphically displayed with reference to FIG. 3. Therein, the calibration threshold K2 is represented by the difference between broken line 32 and Pbat_min broken line 33, and Pbat is represented by solid line 31. At a time A, it can be observed that the Pbat/Pbat_min difference (Δ) is equivalent to the calibrated threshold value K2. This event indicated that it is time to request an engine retard torque contribution to since the remaining capacity of the battery power flow is significantly diminished. Where capacity remains above the limit, step 62 provides an alternative determination as to whether conditions dictate setting of the REQUEST flag to effect braking assistance from engine retard torque contributions. Here, the predetermined desired retarded engine speed Ne_des is evaluated against a calibration threshold (K3) as an indicator of the desirability of requesting engine retarder activation. K3 represents a significant departure from a relaxed throttle idle or coastdown engine speed. For example, a value of substantially 1700 RPM may provide an adequate threshold value though the actual value is application specific and determined in accordance with conventional calibration techniques, engine and system characteristics. A high desired retarded engine speed therefore results in the setting of REQUEST flag at step 63 thus indicating the desirability of effecting activation of the engine retarder.

Step 64 is encountered subsequent to the setting or bypass of setting the REQUEST flag. Here, a determination is made whether the battery has sufficient capacity to accept the power presently being dissipated by engine retard and whether the desired retarded engine speed falls below a calibrated minimum engine speed. Affirmative results from both determinations will result in the REQUEST flag being reset to false thereby indicating the desirability of effecting deactivation of the engine retarder. In step 64, the battery charge power flow limit Pbat_min is compared with the actual battery power flow Pbat. Sufficient capacity to accept the engine retard torque exists when the difference between the actual and limit values for Pbat is greater than the power being dissipated by the engine operating with the engine retarder activated (Pe_ret). Pe_ret is readily established in accordance with engine retard torque Te_ret, engine speed Ne and the known relationship between torque, rotational speed and power. This is graphically displayed with reference to FIG. 3. Therein, Pe_ret is represented by the difference between broken line 35 and Pbat_min broken line 33. At a time B, it can be observed that the Pbat/Pbat_min difference (Δ) is equivalent to the retarded engine power Pe_ret. Where capacity remains below the limit, step 66 will be bypassed and the REQUEST flag will not be reset to false. Step 64 also determines if the predetermined desired retarded engine speed Ne_des is less than a calibration threshold (K4) as an additional indicator of the desirability of requesting engine retarder deactivation. K4 represents an engine speed very close to idle. For example, a value of substantially 1300 RPM may provide an adequate threshold value though the actual value is application specific and determined in accordance with conventional calibration techniques, engine and system characteristics. It is also envisioned that the ESS capacity alone may determine the desirability of scheduling the engine retarder off. A low desired retarded engine speed in combination with sufficient capacity at the battery therefore results in the resetting of REQUEST flag at step 66 thus indicating the desirability of effecting deactivation of the engine retarder. This event indicates that it is time to drop the engine retard torque contribution request since the capacity of the battery power flow is now capable of accepting the power flow currently being dissipated by the retarded engine torque contribution and the desired engine retarded engine speed is minimal. But, a desired retarded engine speed Ne_des higher than the threshold will bypass the resetting regardless of the battery capacity.

With respect to FIG. 7 and the determination of the state of the PERMISSION flag, steps 71, 73 and 75 are executed to evaluate various high priority operating conditions. Step 71 determines whether the throttle pedal has been depressed or taken off idle—a strong indication that an engine retarder torque contribution is undesirable. If so, the PERMISSION flag is reset at step 79. Similarly, at step 73, a determination is made whether the operator has requested or disabled auxiliary braking such as engine retarder braking. Where such a request has not been made or indicated disablement, step 79 causes the resetting of the PERMISSION flag. Finally, Step 75 determines whether anti-lock braking or other stability management control is being effected. If so, the PERMISSION flag is also reset at step 79. Where none of the conditions of steps 71–75 indicate revocation of engine retarder torque contribution, step 77 causes setting of PERMISSION flag.

The present invention has been described with respect to certain preferred and exemplary embodiments. These embodiments are intended to be taken by way of non-limiting example of the invention disclosed herein. Those skilled in the art will recognize various alternative implementations for practicing the invention within the scope of the following claims.

The invention claimed is:

1. Method for controlling retarded engine operation to effect a desired powertrain brake torque in a hybrid powertrain including an unthrottled engine having an engine retard mechanism and an electrically variable transmission having at least one motor operative in a regenerative mode to provide a regenerative brake torque contribution and an energy storage system, comprising:
   providing a desired engine brake torque contribution;
   requesting retarded engine operation based on energy storage system power flow and charge power limit; and
   enabling retarded engine operation when the desired engine brake torque contribution exceeds by a predetermined amount the brake torque available from simple motoring of the engine, and non-engine related powertrain constraints do not limit engine brake torque beyond a predetermined amount.

2. The method as claimed in claim 1 wherein retarded engine operation is requested when power flow into the energy storage system exceeds a predetermined limit.

3. The method as claimed in claim 1 wherein retarded engine operation is not requested when the energy storage system power capacity exceeds the power being dissipated by retarded engine operation.

4. The method as claimed in claim 1 further comprising providing a desired retarded engine speed and requesting retarded engine operation based on desired retarded engine speed and a desired retarded engine speed limit.

5. The method as claimed in claim 1 further comprising providing a desired retarded engine speed and requesting retarded engine operation based on desired retarded engine speed and a desired retarded engine speed limit.

6. Method for scheduling retarded engine operation to effect a desired powertrain brake torque in a hybrid powertrain including an engine including an engine retard mechanism and an electrically variable transmission having at least one motor operative in a regenerative mode to provide a regenerative brake torque contribution and an energy storage system, comprising:
   providing a desired engine braking torque;
   determining whether engine retard operation is enabled based on available simple engine motoring torque, available retarded engine braking torque and desired engine braking torque;
   determining whether engine retard operation is inhibited based on transmission constraints which affect feasible braking torque;
   determining whether engine retard operation is requested based art energy storage system power flow and charge power limit; and
   scheduling engine retard operation based on the enablement of, inhibition of and request for engine retard operation.

7. The method as claimed in claim 6 further comprising freezing the scheduled engine retard operation while a transmission shift is in progress.

8. The method as claimed in claim 6 further comprising overriding engine retard operation based on a high priority condition selected from the group consisting of throttle depression, auxiliary brake request and anti-lock brake active.

* * * * *